(12) United States Patent
Kajiwara et al.

(10) Patent No.: US 12,365,186 B2
(45) Date of Patent: Jul. 22, 2025

(54) INKJET RECORDING APPARATUS AND INKJET RECORDING METHOD

(71) Applicant: CANON KABUSHIKI KAISHA, Tokyo (JP)

(72) Inventors: Yuto Kajiwara, Kanagawa (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/849,523

(22) Filed: Jun. 24, 2022

(65) Prior Publication Data
US 2022/0410585 A1 Dec. 29, 2022

(30) Foreign Application Priority Data

Jun. 29, 2021 (JP) .................................. 2021-108171

(51) Int. Cl.
*B41J 3/01* (2006.01)
*G06K 15/10* (2006.01)

(52) U.S. Cl.
CPC .............. *B41J 3/01* (2013.01); *G06K 15/105* (2013.01)

(58) Field of Classification Search
CPC .... G06K 15/105; G06K 15/107; G06K 1/121; G06K 19/06028; G06K 7/1417; B41M 3/00; B41F 17/02; B41J 2/2132; B41J 3/01
See application file for complete search history.

(56) References Cited

U.S. PATENT DOCUMENTS

| 5,767,889 | A | * | 6/1998 | Ackley | ....................... | B41J 2/32 |
| | | | | | | 347/171 |
| 6,032,863 | A | * | 3/2000 | Nethery, III | ..... | G06K 19/06028 |
| | | | | | | 235/462.07 |
| 2003/0048460 | A1 | * | 3/2003 | Vinals-Matas | ....... | G06K 15/102 |
| | | | | | | 358/1.8 |
| 2004/0121076 | A1 | * | 6/2004 | Haines | ................... | B41J 11/009 |
| | | | | | | 427/284 |
| 2012/0019594 | A1 | | 1/2012 | Inoue | | |

(Continued)

FOREIGN PATENT DOCUMENTS

| CN | 1503550 | A | 6/2004 |
| CN | 101267490 | A | 9/2008 |
| CN | 101521714 | A | 9/2009 |

(Continued)

*Primary Examiner* — John Zimmermann
(74) *Attorney, Agent, or Firm* — CANON U.S.A., INC. IP DIVISION

(57) ABSTRACT

An inkjet recording apparatus includes a recording unit, an acquisition unit, a scanning unit, and a control unit. In the recording unit, a plurality of nozzles to which ink is supplied from a common liquid chamber is arranged in a first direction. The acquisition unit is configured to acquire image data. The scanning unit is configured to perform relative scanning with a recording medium in a second direction intersecting the first direction. The control unit is configured to control ink ejection operation of the recording unit. In a predetermined one time of relative scanning, the control unit uses a first nozzle, and does not use a second nozzle adjacent to the first nozzle in the first direction, for edge areas of a barcode including a plurality of bars in which a length in the first direction is longer than a length in the second direction.

19 Claims, 14 Drawing Sheets

(56) References Cited

U.S. PATENT DOCUMENTS

2014/0061311 A1* 3/2014 Hoshino .............. G06K 7/1456
235/462.08

FOREIGN PATENT DOCUMENTS

| CN | 103150588 A | 6/2013 |
|----|-------------|--------|
| JP | 2002150211 A | 5/2002 |
| JP | 2003-175595 A | 6/2003 |
| JP | 2012016892 A | 1/2012 |
| KR | 20030022059 A | 3/2003 |

* cited by examiner

FIG.7A
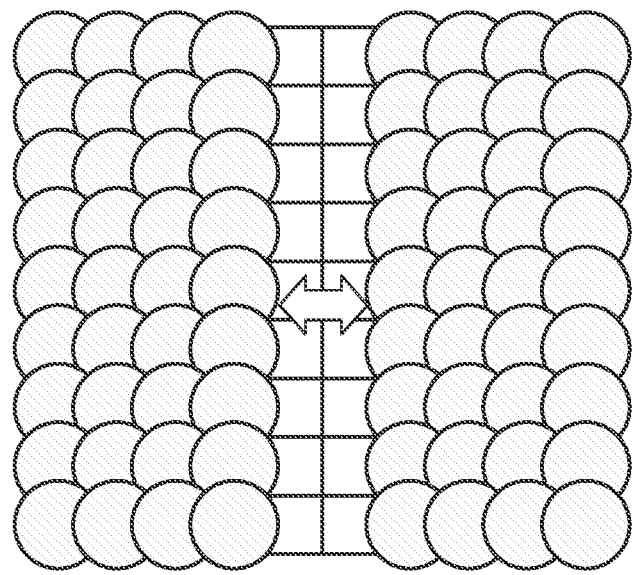
FIG.7B
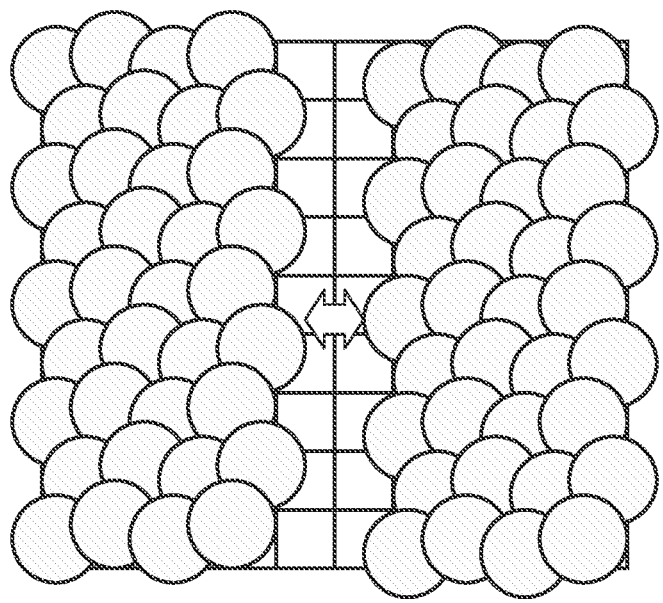
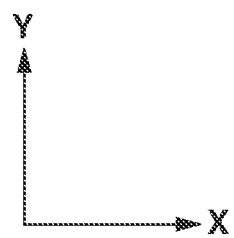

FIG.8A

| | NON-EDGE AREA | | EDGE AREA | |
|---|---|---|---|---|
| | PATTERN A | PATTERN B | PATTERN A | PATTERN B |
| NON-RECORDING "0" | 0 dot | 0 dot | 0 dot | 0 dot |
| RECORDING "1" | 1 dot | 1 dot | 1 dot | 0 dot |

FIG.8B

| A | A | A | A | A | A |
|---|---|---|---|---|---|
| B | B | B | B | B | B |
| A | A | A | A | A | A |
| B | B | B | B | B | B |
| A | A | A | A | A | A |
| B | B | B | B | B | B |

INKJET RECORDING APPARATUS AND INKJET RECORDING METHOD

BACKGROUND

Technical Field

One disclosed aspect of the embodiments relates to an inkjet recording apparatus and an inkjet recording method for recording an image on a recording medium.

Description of the Related Art

In recent years, some inkjet recording apparatuses that perform a multi-pass recording in which an image is recorded by a plurality of times of scanning on a unit area have been available. Such an inkjet recording apparatus records an image on a recording medium by performing control to repeat conveyance control of the recording medium and scanning with a carriage including a recording unit.

Japanese Patent Application Laid-Open No. 2002-150211 discusses a recording apparatus that records a barcode on a recording medium. The barcode recorded on the recording medium is expected to be optically read. Thus, it is desirable to record the barcode with high accuracy.

SUMMARY

One aspect of the embodiments is directed to an inkjet recording apparatus capable of performing recording so that a recorded article has bars, which forms a barcode, with widths intended by a user.

According to an aspect of the embodiments, an inkjet recording apparatus includes one or more processors and one or more memories coupled to the processors storing instructions that, when executed by the processors, cause the processors to function as, a recording unit, an acquisition unit, a scanning unit, and a control unit. In the recording unit, a plurality of nozzles to which ink is supplied from a common liquid chamber is arranged in a first direction. The acquisition unit is configured to acquire image data. The scanning unit is configured to perform relative scanning with a recording medium in a second direction intersecting the first direction. The control unit is configured to control ink ejection operation of the recording unit. In a predetermined one time of relative scanning, the control unit uses a first nozzle, and does not use a second nozzle adjacent to the first nozzle in the first direction, for edge areas of a barcode including a plurality of bars in which a length in the first direction is longer than a length in the second direction.

Further features of the disclosure will become apparent from the following description of exemplary embodiments with reference to the attached drawings.

BRIEF DESCRIPTION OF THE DRAWINGS

FIG. 7A is a diagram illustrating a case where the ink droplets land on ideal positions, and FIG. 7B is a diagram illustrating a barcode in a case where ink landing accuracy decreases.

FIGS. 8A and 8B are diagrams each illustrating an example of the number of ink droplets applied to binary data.

DESCRIPTION OF THE EMBODIMENTS

Some exemplary embodiments of the disclosure are described below with reference to the accompanying drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" refers to any combination of the software and hardware contexts as described above.

A first exemplary embodiment will be described below. The following description is provided assuming image processing inside a printer main body; however, this is merely an example of an exemplary embodiment, and the disclosure is not limited to the following exemplary embodiment.

(Description of Inkjet Recording Apparatus)

Figure 1:
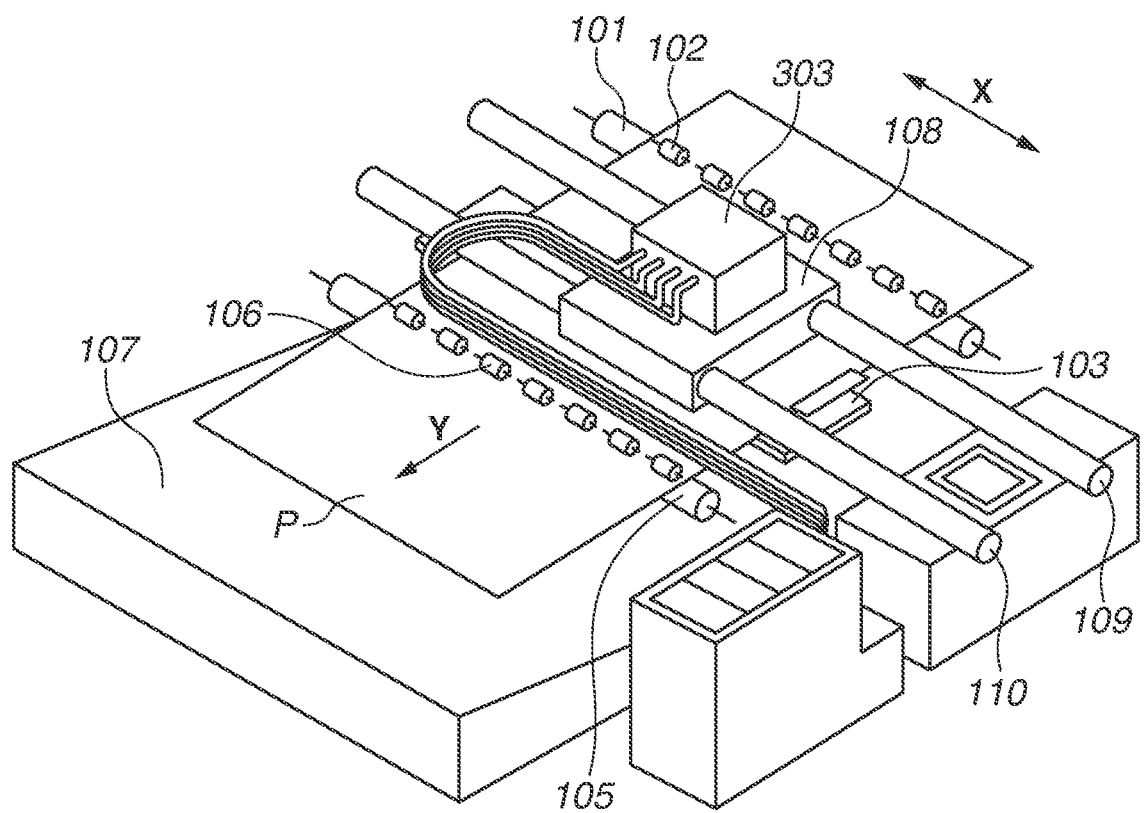
FIG. 1 is a diagram schematically illustrating an inkjet printer.

FIG. 1 is a diagram illustrating a recording apparatus according to the present exemplary embodiment. The recording apparatus is a serial recording inkjet printer, and performs multi-pass recording in which image recording for a unit area is completed by a plurality of times of relative scanning of a recording medium P with a recording head 303.

The recording medium P fed to a recording unit or circuit is conveyed in a Y direction (sub-scanning direction) illustrated by an arrow in FIG. 1 by nip portions formed by a conveyance roller 101 disposed in a conveyance path and pinch rollers 102 following the conveyance roller 101, along with rotation of the conveyance roller 101. A platen 103 is provided at a position facing an ejection port surface on which ejection ports (nozzles) are formed, of the recording head 303 of an inkjet recording method. The platen 103 supports a rear surface of the recording medium P from below to maintain a constant distance between a front surface of the recording medium P and the ejection port surface of the recording head 303. The recording medium P on which an image has been recorded is conveyed in the Y direction along with rotation of a discharge roller 105 while being nipped by the discharge roller 105 and spurs 106 following the discharge roller 105, and is discharged to a discharge tray 107.

The recording head 303 is detachably mounted on a carriage 108 in a posture in which the ejection port surface faces the platen 103 or the recording medium P. The carriage 108 reciprocates in an X direction along two guide rails 109 and 110 with driving force of a carriage motor. During the reciprocation, the recording head 303 performs ejection operation to eject ink droplets from ejection ports in response to a recording signal, thus applying the ink to the recording medium P.

Figure 2:
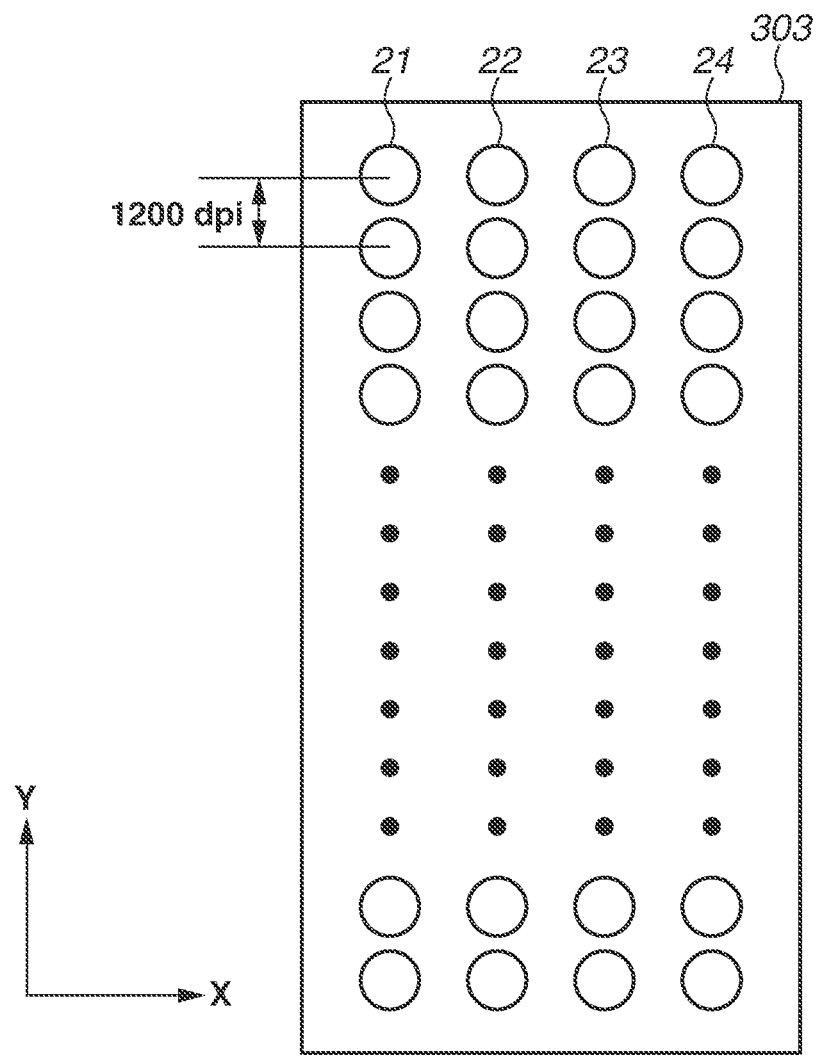
FIG. 2 is a schematic diagram in a case where a recording head is observed from a nozzle formation surface.

FIG. 2 is a schematic diagram in a case where the recording head 303 is observed from the ejection port surface side. In the present exemplary embodiment, a cyan nozzle array 21, a magenta nozzle array 22, a yellow nozzle array 23, and a black nozzle array 24 are arranged in parallel in the X direction as illustrated in FIG. 2. In each of the nozzle arrays, the ejection ports (nozzles) through which the ink are ejected are arranged at equal intervals in the Y direction.

A recording element (not illustrated) is provided inside each of the ejection ports, and heat energy is generated when the recording elements are driven by electric energy. The ink foams with the heat energy, so that the ink is ejected as droplets from the ejection ports. In the following description, an array in which a plurality of ejection ports for ejecting the ink of the same color by the same amount is arranged is referred to as a nozzle array.

The X direction in which the carriage 108 moves intersects the Y direction in which the recording medium P is conveyed, and is called a main scanning direction. The Y direction in which the recording medium P is conveyed is called a sub-scanning direction. The multi-pass recording in which an image is formed on the recording medium P in a step-wise manner is performed by alternate repeating movement of the carriage 108 and the recording head 303 involving recording, which is main scanning, and conveyance of the recording medium P, which is sub-scanning.

Figure 14:
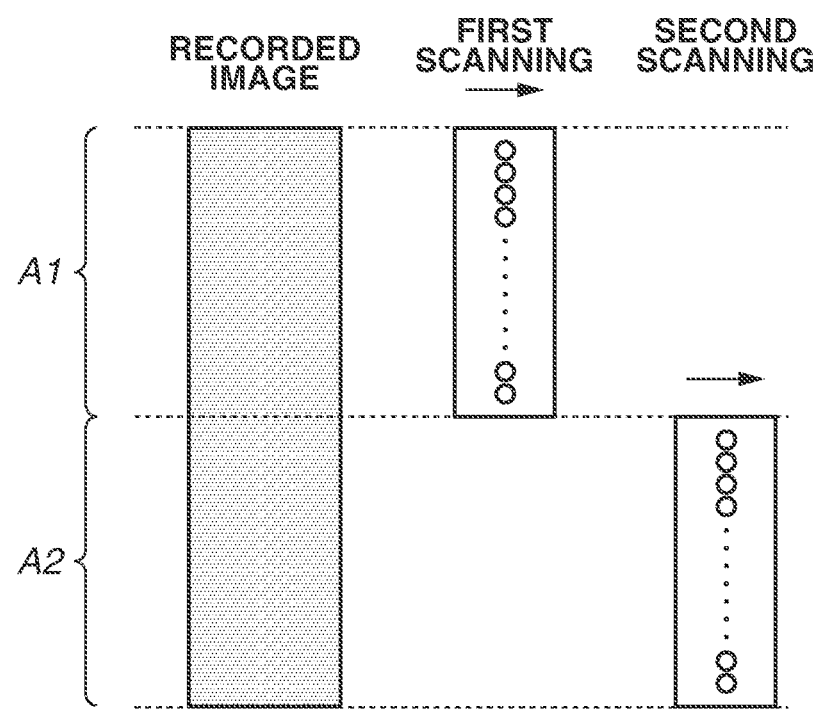
FIG. 14 is a diagram illustrating a recording operation example of multi-pass scanning.

FIG. 14 is a diagram illustrating relationship between the recording medium P and the nozzles (ejection ports) used for image recording during the multi-pass recording. The black nozzle array 24 will be described as an example, and the other nozzle arrays operate in a similar manner.

In first scanning, forward recording in which an image is recorded in an area A1 by using all the nozzles while the carriage 108 and the recording head 303 are being moved in a +X direction (forward direction) is performed. After the first scanning, the recording medium P is conveyed in a +Y direction. The conveyance amount at this time is a length corresponding to all the nozzles. After the carriage 108 and the recording head 303 are returned in a −X direction, forward recording with second scanning is performed. In the second scanning, the carriage 108 and the recording head 303 are moved again in the +X direction, and an image is recorded in an area A2 by using all the nozzles. After the second scanning, the recording medium P is conveyed in the +Y direction. The conveyance amount at this time is also the length corresponding to all the nozzles. Thereafter, the recording medium P is discharged in the +Y direction, and the recording operation ends.

As described above, the recording method in the present exemplary embodiment is a one-pass unidirectional recording method in which the image in each of predetermined areas (A1 and A2) on the recording medium is completed with a single scanning of the recording head 303 in a single direction.

In the above-described example, after the first scanning in the +X direction, the recording head 303 is returned by scanning in the −X direction without recording operation, and the second scanning in the +X direction is then performed. Alternatively, the scanning in the −X direction may be performed as the second scanning involving recording operation. In other words, after the first scanning, the recording medium P is conveyed by the length corresponding to all the nozzles in the +Y direction with the carriage 108 and the recording head 303 not being returned in the −X direction. Thereafter, in the second scanning in the −X direction, an image may be recorded in the area A2 by using all the nozzles.

Figure 3:
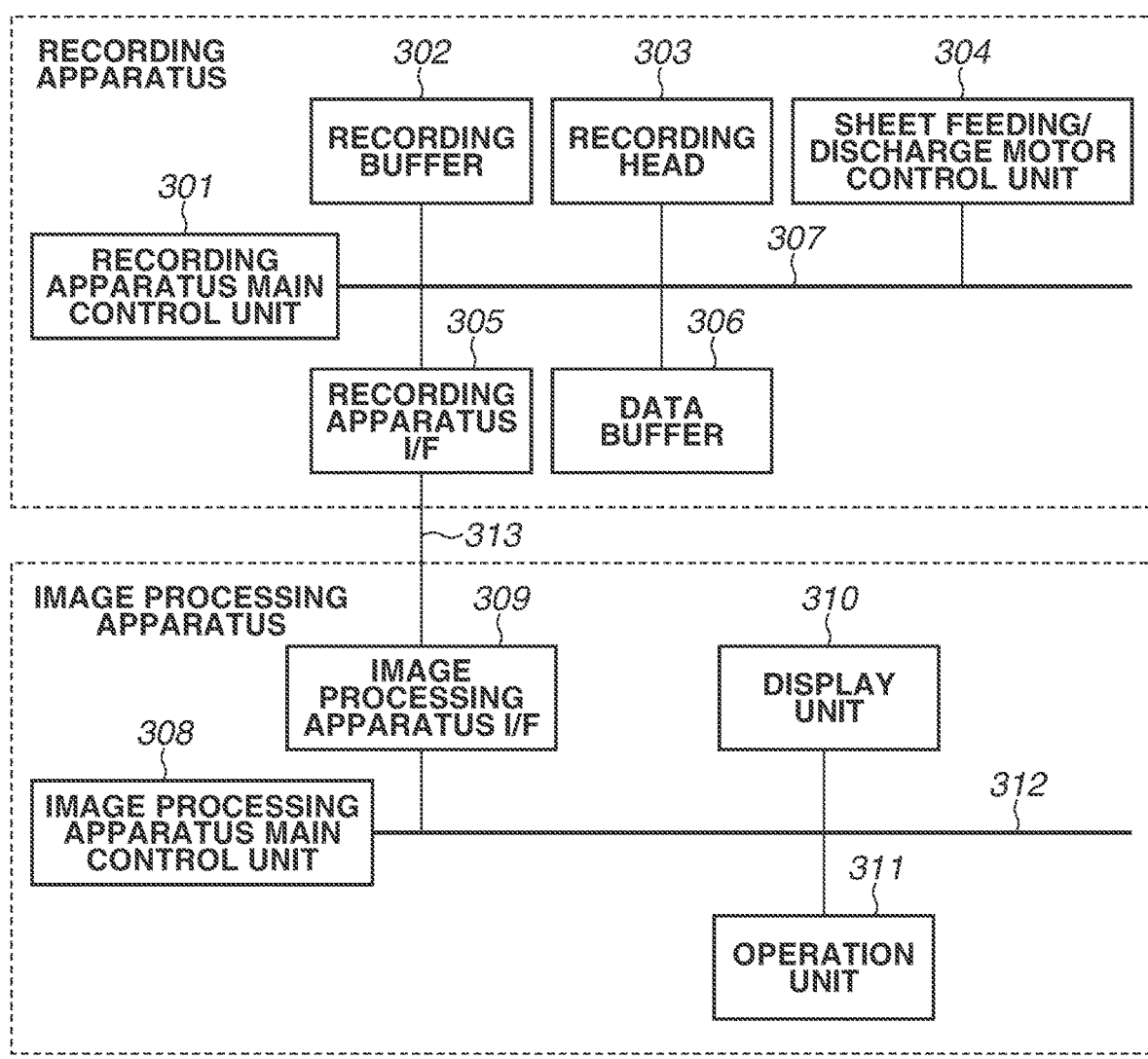
FIG. 3 is a block diagram illustrating a control configuration of an inkjet recording system.

FIG. 3 is a block diagram illustrating a control configuration of an inkjet recording system according to the present exemplary embodiment. A recording apparatus main control unit or circuit 301 controls the entire recording apparatus, and includes a central processing unit (CPU), a read only memory (ROM), and a random access memory (RAM). A recording buffer 302 stores image data before transfer to the recording head 303 as raster data. The recording head 303 is a recording head of the inkjet recording method including the plurality of nozzles capable of ejecting ink droplets, and ejects ink from respective nozzles based on the image data stored in the recording buffer 302. A sheet feeding/discharge motor control unit or circuit 304 controls conveyance, feeding, and discharge of the recording medium. A recording apparatus interface (I/F) 305 is connected to an image processing apparatus through an I/F signal line 313, and transmits and receives data signals. A data buffer 306 temporarily stores image data received from the image processing apparatus. A system bus 307 is used for connecting the functional units of the recording apparatus.

An image processing apparatus main control unit 308 mainly performs creation of an image and control of image data in the image processing apparatus, and includes a CPU, a ROM, and a RAM. An image processing apparatus I/F 309 transmits and receives data signals to/from the recording apparatus. A display unit or circuit 310 displays various types of information to a user, and can include, for example, a liquid crystal display (LCD). An operation unit or circuit 311 receives operation and instructions from the user, and can include a keyboard and a mouse. A system bus 312 is a bus connecting the image processing apparatus main control unit or circuit 308 and the functional units.

(Description of Outline of Recording System)

Figure 4:
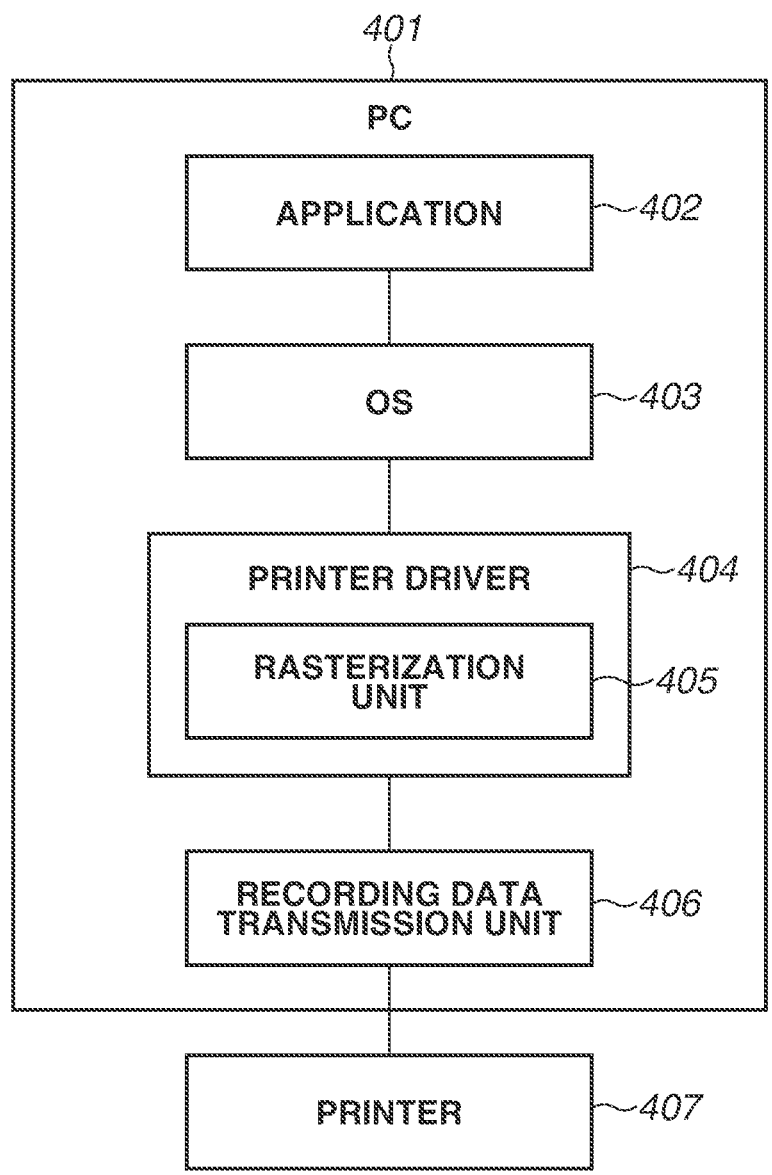
FIG. 4 is a block diagram illustrating a recording system.

FIG. 4 is a block diagram illustrating an outline of the recording system according to the present exemplary embodiment. The recording system illustrated in FIG. 4 includes a personal computer (PC) 401 serving as a host, and a recording apparatus (printer) 407 that records an image based on recording data transmitted from the PC 401. The PC 401 includes an application 402, an operating system (OS) 403, a printer driver 404, and a recording data transmission unit 406. In the present exemplary embodiment, the recording data to be transmitted to the printer 407 includes a barcode image.

The application 402 can insert barcode data into an image. A function to be used for image processing provided by the OS 403 and data obtained from the application 402 are combined and converted into recording data in response to an instruction from the printer driver 404.

The printer driver 404 causes a rasterization unit 405 to rasterize (bitmap) the received recording data into an image with a resolution corresponding to the recording head, thus converting the recording data into recording data receivable by the printer 407. The converted recording data is transmitted to the recording data transmission unit 406 and is then transmitted to the printer 407.

A description will now be provided of a process until a predetermined character string is transmitted as barcode data to the printer in the recording system according to the present exemplary embodiment. The barcode data is image data including a barcode, which includes a combination of bars and spaces. The barcode image is generated by converting the predetermined character string into a format including bars and spaces by a barcode font.

When the character string is input to the application 402, the printer 404 is called via the OS 403. Thereafter, barcode font information stored in the printer driver 404 is requested, and a barcode font designated by the user is set.

The barcode font information includes information about a barcode font name selected from a plurality of types of barcodes previously registered, and information such as a height and a width of the barcode font. Examples of the barcode font information include a Japanese Article Number (JAN) code, CODE 39, and CODE 128. The setting value of the barcode font and image data are transmitted from the application 402 to the printer driver 404 via the OS 403.

Thereafter, the rasterization unit 405 rasterizes the image data into barcode data including a combination of one-dimensional bars and spaces by using the designated barcode font. The rasterized data is converted into recording data receivable by the printer 407, and the recording data is transmitted to the printer 407 via the recording data transmission unit 406.

In the present exemplary embodiment, the configuration in which the application calls the barcode font stored in the printer driver via the OS has been described; however, the configuration is not limited thereto.

(Description of Outline of Entire Flow)

Figure 5:
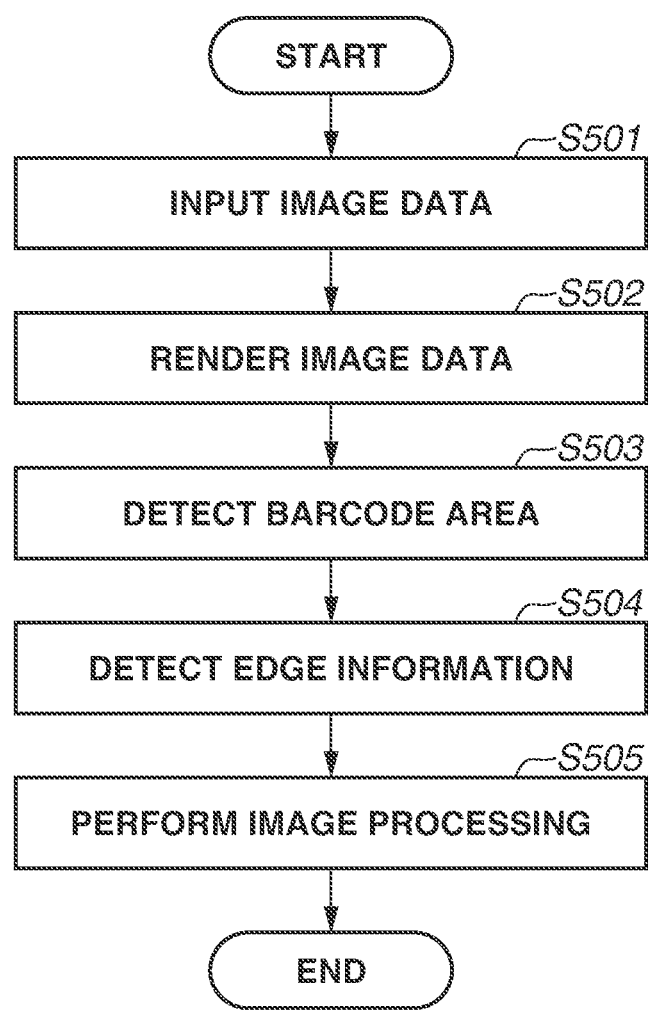
FIG. 5 is a flowchart of image data processing performed by an image processing apparatus.

FIG. 5 is a flowchart illustrating image data processing which is performed by the image processing apparatus according to the present exemplary embodiment. The processing illustrated in FIG. 5 may be performed by the PC 401 serving as a host, may be performed by the printer 407, or may be partially shared by the PC 401 and the printer 407.

In step S501, image data is input. The image data to be input may be vector data or bitmap data.

In step S502, the input image data is rendered, and the vector data is rasterized. At this time, mapping, pagination, and the like corresponding to a size of the recording medium on which the image is to be recorded are performed in some cases.

Image data corresponding to pixels arranged in one line in a predetermined direction among the pixels arranged in a matrix is called rater data. Data corresponding to a plurality of such lines aligned is called band data. In a case where the printer 407 performs the image processing on these pieces of data, the image processing is performed with a small ROM capacity and a small RAM capacity in some cases, and the band data is sequentially processed in most cases.

In step S503, a barcode detection unit detects a barcode area. At this time, a position of the detected barcode is acquired. The barcode data may be formed through rasterization from the barcode font, or may be formed as bitmap data or vector data from the start. Thus, barcode information may be acquired in the rendering in step S502, or may be detected from edge information or the like after bitmapping. The user may designate the barcode information on a panel or on the host, and the method is not limited in the present exemplary embodiment.

In step S504, an edge detection unit detects edge information on bars included in the barcode. At this time, as the edge information, information about pixels corresponding to edge areas of the bars, and information on pixels corresponding to non-edge areas that are areas inside the edges are detected. Control for the edge areas of the barcode, which will be described below, is performed by using the positional information for the barcode acquired in step S503 and the detected edge information. The edge detection processing can be performed by a known method, such as a Sobel filter, a Laplacian filter, or the like. The edge detection processing may be performed on the entire area of the input image data, or may be performed only on the detected barcode area.

In step S505, image processing for converting the image data into image data in a format recordable by the printer 407 is performed. At this time, the image data generated in step S504 is converted into image data corresponding to color reproduction gamut of the printer 407.

In the present exemplary embodiment, the input image data represents color coordinates (R, G, B) in a color space coordinate such as a sRGB color space for representation colors of a monitor. The 8-bit input image data R, G, B is converted into image data (R', G', B') in the color reproduction gamut of the printer by a known method, such as matrix calculation processing and processing using a three-dimensional lookup table (LUT).

Next, the 8-bit image data R', G', B' is converted into image data including color signal data corresponding to ink colors used in the printer 407. The printer 407 according to the present exemplary embodiment records an image by using ink of black (K), cyan (C), magenta (M), and yellow (Y). Thus, the image data of the RGB signals is converted into image data including 8-bit color signals K, C, M, Y. This color conversion is performed by using the three-dimensional LUT and interpolation calculation together. As another conversion method, the method such as matrix calculation processing may be used as in the case described above. The ink colors are not limited to four colors K, C, M, Y. Ink of light cyan (Lc), light magenta (Lm), and gray (Gy) with low density, clear ink, ink of a special color, and other types of ink may be additionally used.

Next, process of correcting the 8-bit image data to adjust the number of dots to be recorded on the recording medium is performed. Relationship between the number of dots to be applied to the recording medium and optical density which is reproduced on the recording medium by the number of dots is not linear. Thus, adjustment is performed to establish linear relationship. In the adjustment process, one-dimensional LUT can be used to convert the input data into output data.

Next, quantization processing is performed on the 8-bit 256-value image data for each ink color. Through the quantization processing, 1-bit binary data representing recording "1" or non-recording "0" is generated for each pixel. An output of the quantization processing may be the number of ink droplets per a certain unit area without being limited to 1-bit binary data representing recording "1" or non-recording "0". The image data may be quantized into multi-valued data of two bits or more. An error diffusion method and a dither method are known as a method for the quantization processing, but any method is usable.

The ink is applied based on the image data generated in step S505, thus recording an image on the recording medium.

(Description of Barcode)

The barcode includes a combination of bars and spaces, and the bars and spaces are parallel to one another and each have a rectangular shape. A minimum width unit of each of the bars and the spaces is called a basic module width or a minimum element width, and the bars and the spaces are configured based on the width. The width of each of the bars and the spaces has characteristics depending on a type of the barcode. For a binary-level barcode, each of the bars and the spaces has either one of two levels of widths (up to twice reference). For a multilevel barcode, each of the bars and the spaces has any of a plurality of widths, for example, four levels of widths (up to four times reference). The multilevel barcode generally includes many types of bar width as compared with the binary-level barcode. Accordingly, for the multilevel barcode, an allowable range to variation of the width is narrow, and higher recording accuracy is required.

A blank space called a quiet zone is to be disposed in each of right and left areas of the barcode.

A necessary size of the blank space is different depending on the type of barcode. If the size of the blank space is less than the necessary size, the barcode may not be read.

A barcode reader uses a red light source. Light is applied from the light source to the barcode, and reflected light is read. Thus, to appropriately read the barcode, a color of areas for the bars is to be the one that absorbs a wavelength of the red light, and a color of areas for the spaces is to be the one that reflects the wavelength of the red light. The barcode generally includes black bars and white spaces in many cases; however, the bars may be formed with a color absorbing the wavelength of the red light, for example, blue or green, and the spaces may be formed with a color reflecting the wavelength of the red light, for example, red or yellow.

To enable the barcode reader to appropriately read the barcode, elements demanded for quality of the recorded barcode are standardized as follows by International Organization for Standardization/International Electrotechnical Commission (ISO/IEC) 15416.

Minimum reflectance is a minimum reflectance in the entire barcode. When the minimum reflectance is 50% or less, the barcode is readable.

Symbol contrast is a difference between the maximum reflectance and the minimum reflectance in the entire barcode.

The symbol contrast is represented by a value obtained by subtracting the darkest reflectance of the bars from the brightest reflectance of the spaces. The readability of the barcode increases as the value is larger.

Minimum edge contrast is a minimum value among differences in reflectance between a space and the bar(s) adjacent thereto. When the minimum difference is 15% or more, the barcode is readable.

Modulation is a ratio of a minimum edge contrast to the symbol contrast. The readability of the barcode increases as a difference in reflectance between a space and the bar(s) adjacent thereto is larger.

Defects are a flaw (void) in any of the bars and a dirt (spot) in any of the spaces. When a nonuniform valley of reflectance occurs relative to one ridge corresponding to a maximum reflectance in each space, the readability of the barcode increases as a difference between the maximum reflectance at the ridge and the reflectance at the valley is smaller. For bars, the ridge and the valley are reversed from the ridge and the valley of each space.

Decodability is a margin when a value is determined based on a decoding rule defined for each barcode. The readability of the barcode increases as an actual measured value of widths of the bars and the spaces are closer to ideal widths.

(Barcode Recording)

Among the above-described elements, the modulation is an issue in the inkjet recording apparatus. In the inkjet recording apparatus, simultaneous ejection of ink droplets from a large number of nozzles may decrease ejection stability of the ink. The decrease in the ejection stability presumably leads to a drop in accuracy of the ink landing on the recording medium, so that the ink may land on positions deviated from intended landing positions. As a result, the widths of the bars forming the barcode may be varied due to deviation of the landing positions, which may exert influence on a reading result. Details of the ejection stability of the recording head will be described below.

Figure 6:
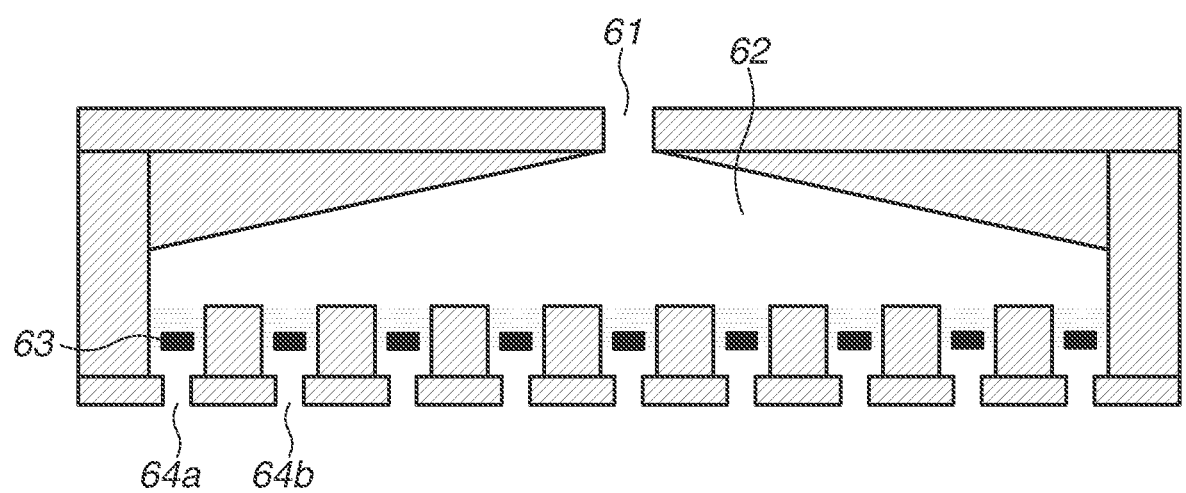
FIG. 6 is a sectional view of an ink passage illustrating a flow of ink in the recording head.

FIG. 6 is a schematic sectional view of an ink passage illustrating a flow of ink as liquid in the recording head 303. The ink is supplied from an ink tank (not illustrated) to a common liquid chamber 62 through an ink supply port 61. The ink supplied to the common liquid chamber 62 is filled into a nozzle 64a through the passage. When a voltage is applied to a heater 63 as a recording element provided above the nozzle 64a, the ink foams, and ink droplets are ejected from the nozzle 64a.

Most of energy by the foaming is converted into ejection of the ink droplets, but part of the energy propagates from the nozzle 64a to the common liquid chamber 62. The propagated energy vibrates the ink in the common liquid chamber 62, and exerts influence on meniscus vibration of the ink filled in a nozzle 64b adjacent to the nozzle 64a. In this manner, in the head configuration in which the ink is supplied from the common liquid chamber 62 to the nozzle 64a and the nozzle 64b adjacent to the nozzle 64a, the ejection operation of the ink droplets of the nozzle 64a vibrates the ink inside the nozzle 64b. As a result, ejection operation of the ink from the nozzle 64b becomes unstable.

FIGS. 7A and 7B are diagrams illustrating a case where the ink landing positions on the recording medium are deviated due to such decrease in the ejection stability. FIG. 7A illustrates a case where the ink droplets land on ideal positions, and FIG. 7B illustrates a case where landing positions of the ink droplets are deviated due to influence of the ejection operation of the adjacent nozzle. In FIG. 7B, the widths of the bars configuring the barcode are wider than the widths of the bars in the image data, due to deviation of the landing positions. In particular, in a case where each space between two bars is expressed by a blank space where the ink is not applied, each space is narrowed by the thick bars as illustrated in FIG. 7B, unlike the case where the ink droplets land on the ideal positions as illustrated in FIG. 7A.

The barcode image includes the plurality of bars and the plurality of spaces, and there are varieties of the bar width and the space width. In particular, when the above-described landing deviation occurs for the bars adjacent to the space having a narrow width, the space is crushed, and sufficient reflectance is not obtainable. Decrease in the reflectance of the space leads to decrease in the difference with the reflectance of the adjacent bars, and the modulation decreases. As a result, the barcode cannot be correctly read. Characteristic configurations according to the present exemplary embodiment to solve such an issue will be described below.

(Description of Recording Control)

FIG. 8A is a diagram illustrating the number of ink droplets to be applied per unit area when 1-bit binary data representing recording "1" or non-recording "0" is input. As illustrated in FIG. 8A, patterns A and B are prepared. It is designated that, when the binary data represents the recording "1", one dot is recorded to each of non-edge areas of the bars of the barcode image in both of the patterns A and B. It is designated that, when the binary data represents the recording "1", one dot is recorded to each of edge areas of the bars of the barcode in one of the patterns, and zero dot recording, namely, recording is not performed on each of the edge areas of the bars of the barcode in the other pattern.

FIG. 8B illustrates a pattern allocated to the input image data. It is possible to control which of the patterns A and B is allocated to the input value by the pattern. In the present exemplary embodiment, control can be performed such that the two adjacent nozzles do not simultaneously eject the ink to a target area, by synchronizing the patterns and a pitch of the nozzles. In this example, even when the binary data represents the recording "1", the ink is not ejected to pixels in the pattern B. In other words, the control is performed such that the ink is ejected to the edge area only from odd-numbered nozzles, and the ink is not ejected from even-numbered nozzles.

Figure 9:
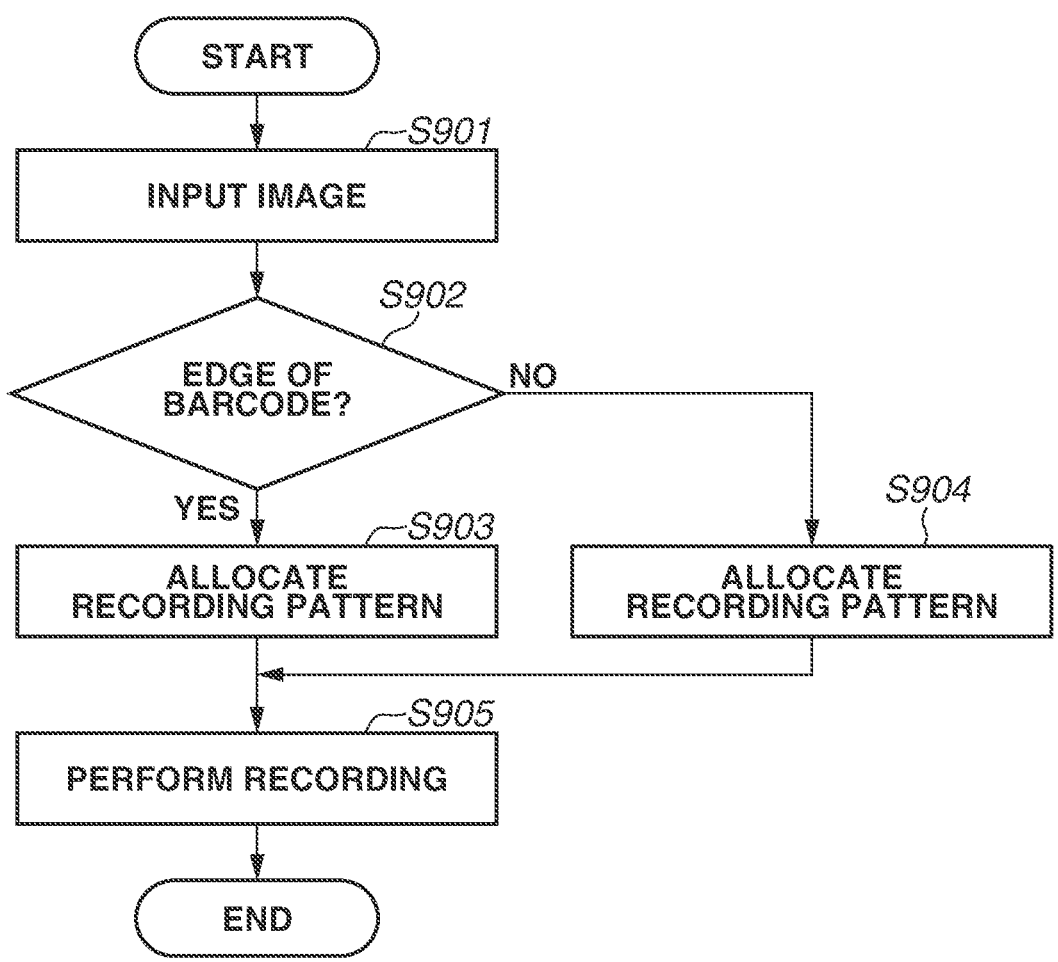
FIG. 9 is a flowchart illustrating processing for improving ejection stability according to a first exemplary embodiment.

FIG. 9 is a flowchart illustrating processing of recording image data by a recording apparatus main control unit or circuit 301.

In step S901, image data in a binary data format and the information indicating the detected edge areas of the barcode are input.

In step S902, determination as to whether a pixel corresponds to the detected edge areas of the barcode is made for each of the pixels.

In steps S903 and S904, the recording patterns are allocated as illustrated in FIGS. 8A and 8B, and the number of ink droplets to be applied per unit area is determined. As a result, in the non-edge areas of the barcode, one dot is applied to each pixel having the value "1" indicating recording, whereas in the edge areas of the barcode, even for the respective pixel that has the value "1" that indicating recording, a pixel with no application of a dot is generated.

Finally, in step S905, recording based on the applied number of ink droplets is performed, and the ink is applied.

Figure 10:
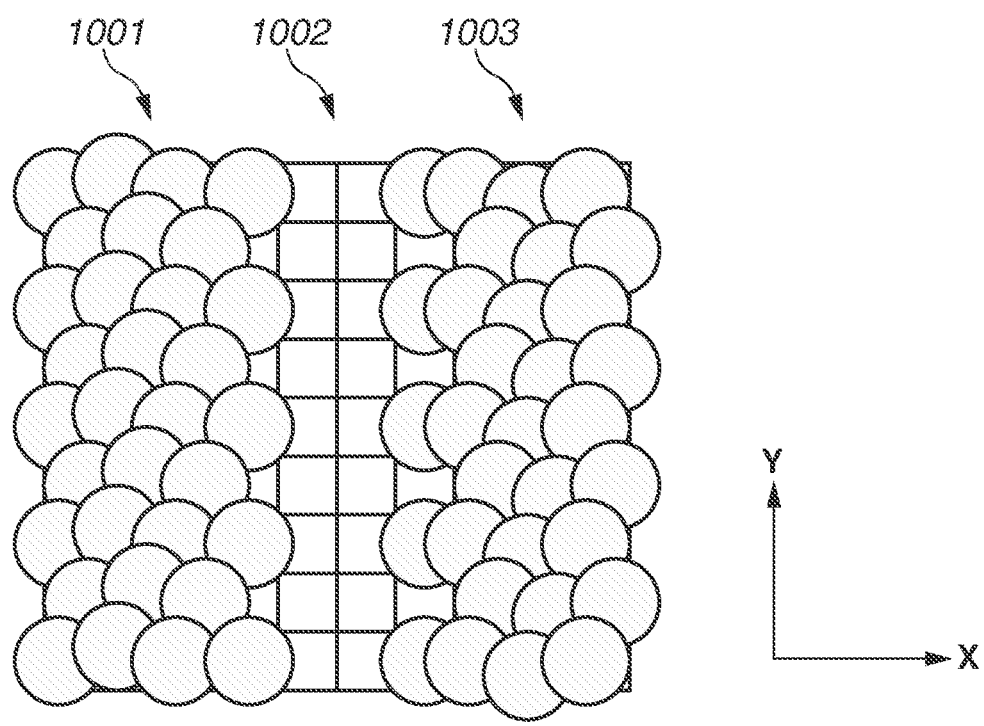
FIG. 10 is a diagram illustrating a barcode improved in ink landing accuracy according to the first exemplary embodiment.

FIG. 10 is a diagram illustrating dot arrangement of the barcode recorded on the recording medium. The control is performed such that the two nozzles adjacent in a vertical direction in FIG. 10 do not simultaneously eject the ink to the edge areas of a bar area 1001 and a bar area 1003. When it is seen by human eyes, if linearity in the vertical direction is lost in the edge areas of the bars, the human eyes perceive the bar as if the reading accuracy of the barcode decreases. However, linearity in the vertical direction of the edge areas is unnecessary for the barcode. Thus, the reading accuracy does not decrease even when such processing is performed.

As described above, in the case where the two adjacent nozzles simultaneously eject the ink in the inkjet recording apparatus, ejection becomes unstable, and the landing accuracy decreases. In contrast to this, limiting the simultaneous ejection from the two adjacent nozzles enables stabilization of ejection, thus preventing decrease in the landing accuracy. In this way, preventing landing deviation for the edge areas of the bars on the both sides enables prevention of decrease in reflectance of a space area 1002 adjacent to the bars. In the present exemplary embodiment, the control is performed so as not to limit the simultaneous ejection from the two adjacent nozzles for areas other than the edge areas of the bars. This is because, in the modulation, which is one of the elements demanded for the barcode, it is desirable that the difference in reflectance between a space and the bars adjacent thereto be large. For the areas other than the edge areas of the bars, the simultaneous ejection from the two adjacent nozzles enables reduction of the reflectance of the bar areas, thus preventing degradation in the modulation in reading of the barcode.

In the present exemplary embodiment, to limit the simultaneous ejection from the two adjacent nozzles, the binary recording data indicating whether to apply the ink is changed; however, similar effects can be produced through other methods. For example, in a case where the number of dots to be recorded on the recording medium is adjusted by using the one-dimensional LUT in step S505, the LUT may be changed to an LUT having different adjusted values, based on information indicating whether the pixel corresponds to the edge areas of the barcode. The quantization processing may be performed such that the value of the pixel corresponding to one of any two adjacent nozzles becomes non-recording "0", based on the information whether the pixel corresponds to the edge areas of the barcode.

In the present exemplary embodiment, the edge areas and the non-edge areas are detected as the edge information on the barcode. With regard to areas other than the barcode, processing similar to the processing performed on the non-edge areas of the barcode is desirably performed. In other words, the simultaneous ejection from the two adjacent nozzles may be limited only for the edge areas of the barcode, and the simultaneous ejection may not be limited for the other areas.

In the present exemplary embodiment, while the edge areas of the barcode are extracted by using the edge detection filter and the like, and the simultaneous ejection from the two adjacent nozzles for the edge areas is limited, the limitation on all of the edge areas is not necessary. The issue to be solved is bleeding of the ink in the edge areas extending in the Y direction, which is an arrangement direction of the plurality of nozzles. Thus, only the edge areas of the barcode including the bars extending in the Y direction, namely, the bars in which a length in the Y direction is longer than a length in the X direction, and the spaces may be detected. At the edges in the X direction, the issue in reading caused by bleeding does not occur. Thus, only sides of the bars extending in the Y direction (in up-down direction in FIGS. 7A and 7B) may be detected as the edge areas.

The barcode has a configuration in which reflected light at portions where light is applied is read, and it is sufficient to limit the simultaneous ejection from the adjacent nozzles in a most part of the edge areas of the barcode. For example, even in a case where the simultaneous ejection from the adjacent nozzles is performed on a part of the edge areas, the beneficial effects of the present exemplary embodiment can be achieved.

In the example illustrated in FIGS. 8A and 8B, the control is performed such that the ink is ejected from the odd-numbered nozzles to which the pattern A is allocated and that the ink is not ejected from the even-numbered nozzles to which the pattern B is allocated. Thus, in a case where a number of the ink simultaneously ejected from all of the nozzles is 100%, a ratio of the ink ejected from the odd-numbered nozzles is 100%, and a ratio of the ink ejected from the even-numbered nozzles is 0%. As described above, when influence of the simultaneous ejection can be controlled, the ratio of the ink from one of the even-numbered nozzles and the odd-numbered nozzles may not be 0%. The ink may be ejected from the even-numbered nozzles. In the present exemplary embodiment, the ratio of the ink ejected from the odd-numbered nozzles to the non-edge areas is 100%, the ratio of the ink ejected from the even-numbered nozzles to the non-edge areas is 100%, and a difference therebetween is 0%. On the other hand, the ratio of the ink ejected from the odd-numbered nozzles to the edge areas is 100%, the ratio of the ink ejected from the even-numbered nozzles to the edge areas is 0%, and a difference therebetween is 100%. It is desirable that the difference between the ratios of the ink ejected from the two adjacent nozzles to the edge areas be greater than the difference between the ratios of the ink ejected from the two adjacent nozzles to the non-edge areas. The relationship between the odd-numbered nozzles and the even-numbered nozzles may be reversed, and the ratio of the ink ejected from the even-numbered nozzles to the edge areas may be large.

In the present exemplary embodiment, while the form in which the 8-bit 256-value image data is quantized into the binary data representing recording "1" or non-recording "0" has been described, the image data may be quantized into multi-valued data of three or more values. In a case where the image data is quantized into the multi-valued data, binary recording data can be generated by further converting one pixel of the multi-valued data into a plurality of pixels by using an index. For example, data representing recording or non-recording for four pixels including two pixels in a vertical direction and two pixels in a lateral direction is generated from one pixel of the multi-valued data. In performing index expansion, an index with which the simultaneous ejection is not to be performed on the edge areas of the barcode may be adopted. For example, with regard to the recording data of the four pixels including the two pixels in the vertical direction and the two pixels in the lateral direction, an index with which data in which the ink is ejected from only one of the two adjacent nozzles and the ink is not ejected from the other nozzle is to be generated may be adopted. In other words, the simultaneous ejection can be limited by using the index with which data indicating ejection of the ink only to the upper two pixels or the lower two pixels are applied.

A second exemplary embodiment will be described below. In the present exemplary embodiment, components different from the components in the first exemplary embodiment will be described. Components similar to the components in the first exemplary embodiment are denoted by the same reference numerals, detailed descriptions of the components are omitted, and only different components are described in detail.

In the first exemplary embodiment, the edge areas of the barcode are detected, the ejection stability is enhanced by limiting the simultaneous ink ejection of the two adjacent nozzles in one time of scanning, and recording of the barcode image is completed by one time of scanning. This is called one-pass recording. In the present exemplary embodiment, a configuration in which recording of the barcode image is completed by multi-pass recording will be described. In the multi-pass recording, a plurality of image data corresponding to each of a plurality of times of scanning is generated based on the input image data, and an image is recorded by the plurality of times of scanning.

Figure 11A:
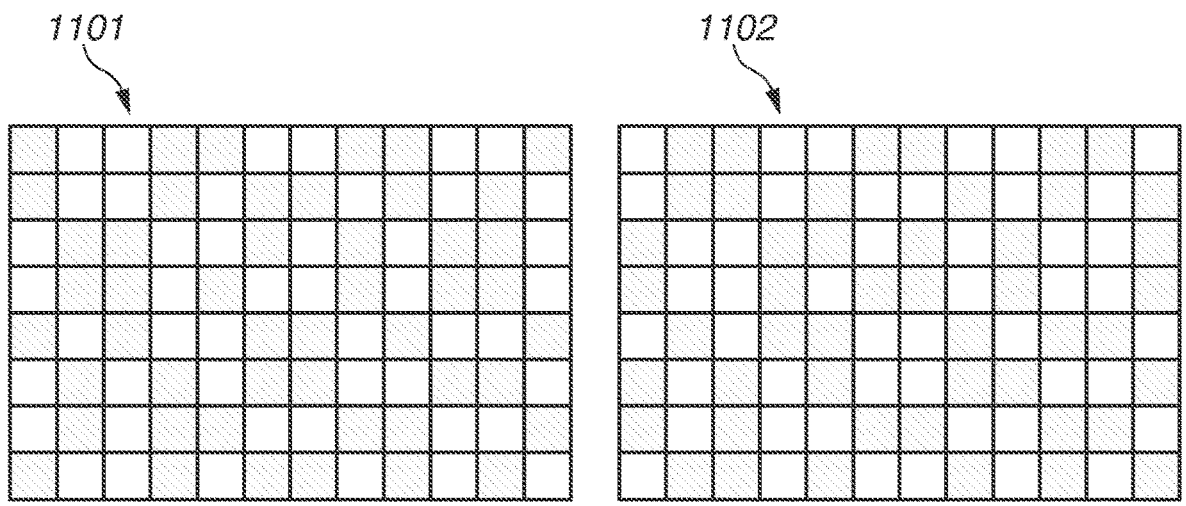
FIGS. 11A and 11B are diagrams illustrating examples of pass masks in a case where the barcode is divided and recorded.
Figure 11B:
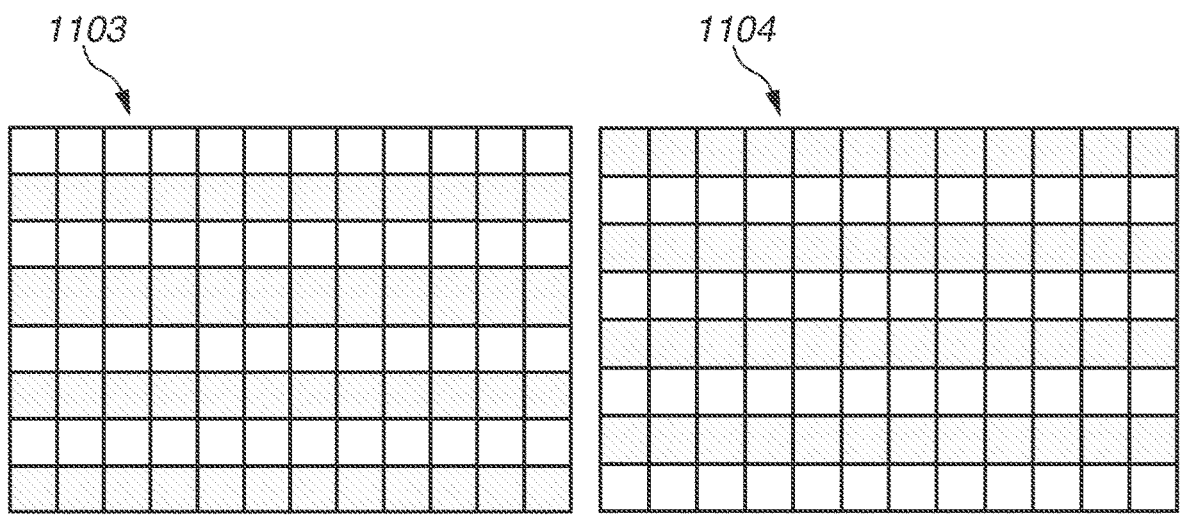

FIGS. 11A and 11B are diagrams illustrating pass masks used to divide the image data when the image data is divided and recorded by two times of scanning FIG. 11A illustrates pass masks used for the non-edge areas of the barcode, and FIG. 11B illustrates pass masks used for the edge areas of the barcode. Pixels illustrated by oblique lines are recording pixels in which application of the ink is allowed in the scanning, and white pixels are non-recording pixels in which application of the ink is not allowed. The two masks have exclusive relation, and recording is performed on all of the pixels by two times of scanning.

In FIG. 11A, during the first scanning for the non-edge areas of the barcode, recording is performed based on recording data generated by using a mask 1101, and during the second scanning, recording is performed based on recording data generated by using a mask 1102. In FIG. 11B, during the first scanning for the edge areas of the barcode, recording is performed based on recording data generated by using a mask 1103, and during the second scanning, recording is performed based on recording data generated by using a mask 1104. The recording pixels and the non-recording pixels of each mask are arranged so as not to perform the simultaneous ejection from the two adjacent nozzles in recording performed by each scanning for the edge areas.

Figure 12:
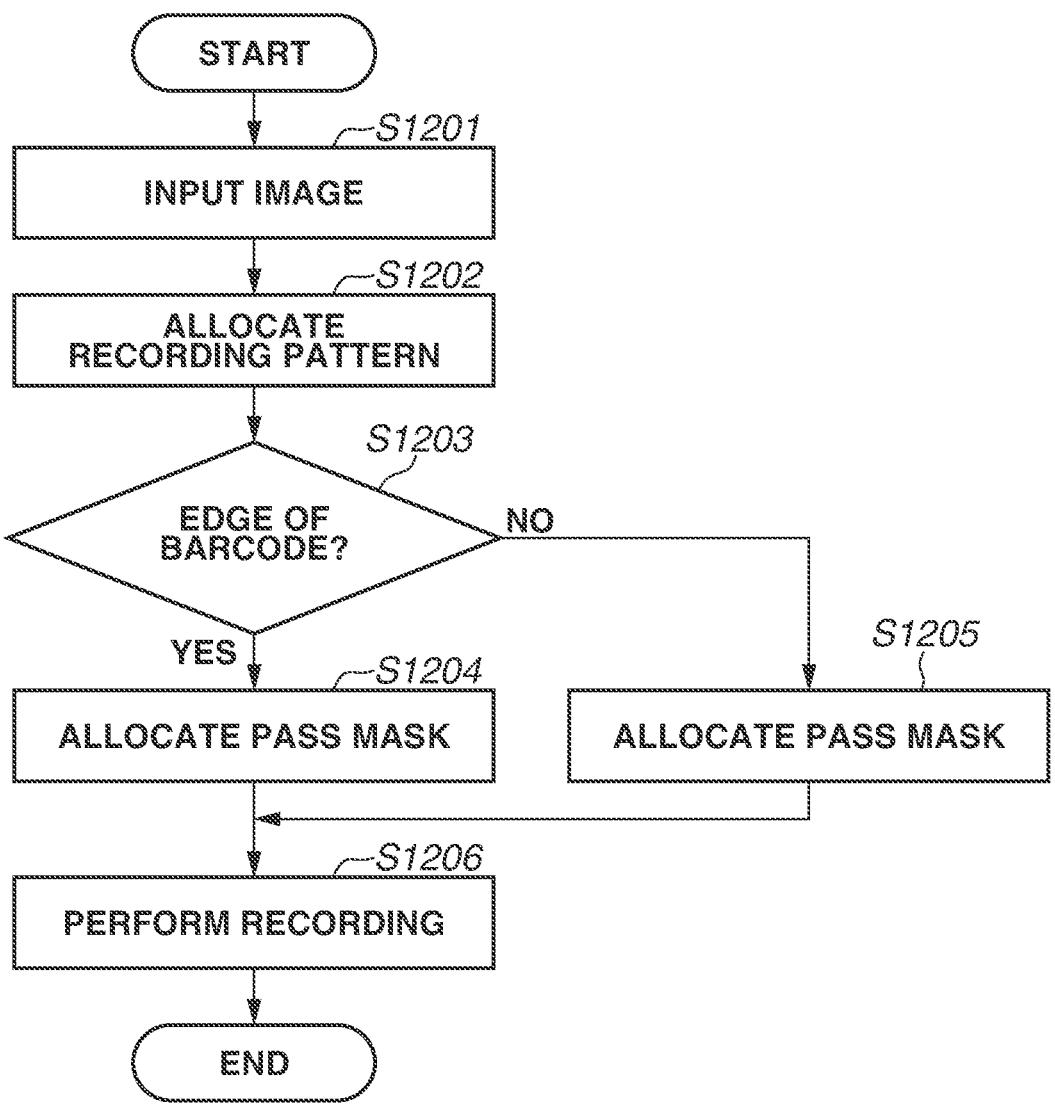
FIG. 12 is a flowchart illustrating processing for improving ejection stability according to a second exemplary embodiment.

FIG. 12 is a flowchart illustrating processing of recording image data according to the present exemplary embodiment.

In step S1201, image data in a binary data format and the information indicating the detected edge areas of the barcode are input.

In step S1202, the number of ink droplets to be applied per unit area is determined. In the present exemplary embodiment, one dot is applied to a pixel having a value representing recording "1", irrespective of whether the pixel corresponds to the edge areas or the non-edge areas of the barcode.

In step S1203, determination as to whether a pixel corresponds to the edge areas of the barcode is made for each of the pixels.

In steps S1204 and S1205, pass masks are allocated to the binary data. Through this processing, the pass masks that are set so as not to perform the simultaneous ejection from the two adjacent nozzles in the same scanning are allocated to the edge areas of the barcode.

Finally, in step S1206, an image is recorded based on respective pieces of recording data corresponding to two times of scanning.

In the present exemplary embodiment, the pass masks in which the recording pixels and the non-recording pixels are arranged so as not to perform the simultaneous ejection from the two adjacent nozzles in one time of scanning are used for the edge areas of the barcode. The limitation is performed so as not to perform the simultaneous ejection from the two adjacent nozzles, which stabilizes the ink ejection operation of each of the nozzles, thus preventing decrease in the landing accuracy.

In the case where the image data is divided and recorded by the plurality of times of scanning, even with limitation of the simultaneous ejection from the two adjacent nozzles, it is possible to maintain the total number of dots provided to the recording medium. Thus, for the modulation that is one of the elements required for the barcode, the reflectance of the space areas can be increased while the reflectance of the bar areas is kept low. This makes it possible to maintain the reading accuracy.

In the present exemplary embodiment, the configuration in which the image data is divided and the image including the barcode is recorded by two times of scanning has been described. The present exemplary embodiment is similarly applicable to a configuration in which the image data is divided and the image including the barcode is recorded by three or more times of scanning. In other words, controlling the simultaneous ejection from the two adjacent nozzles in one time of scanning makes it possible to obtain the barcode image with high image quality while achieving the ink ejection stability.

OTHER EMBODIMENTS

In the above-described exemplary embodiments, the method of maintaining the ejection stability by limiting the simultaneous ejection of the two adjacent nozzles has been described. Depending on a nozzle interval of the recording head and a passage length to the liquid chamber, the vibration of the ink via the common liquid chamber may exert influence on the ejection operation of the nozzle separated by two or more nozzles. In the disclosure, the simultaneous ejection of the nozzles within a range in which the ejection operation exert influence may be limited.

In the above-described exemplary embodiments, the limitation is performed so as not to perform the simultaneous ejection from the two adjacent nozzles. The ejection of the ink to the pixels arranged in the same line (in same column) in the nozzle arrangement direction (Y direction in drawing) on the recording medium is defined as the simultaneous ejection. Depending on a driving frequency of the recording head and a composition of the ink, a degree of influence of the vibration of the ink from the adjacent nozzle varies. Thus, the issue may not be solved only with the ejection limitation of the adjacent nozzles for the recording of one pixel in the X direction. Thus, the simultaneous ejection for an area including two or more pixels continuous in the X direction may be limited.

Figure 13:
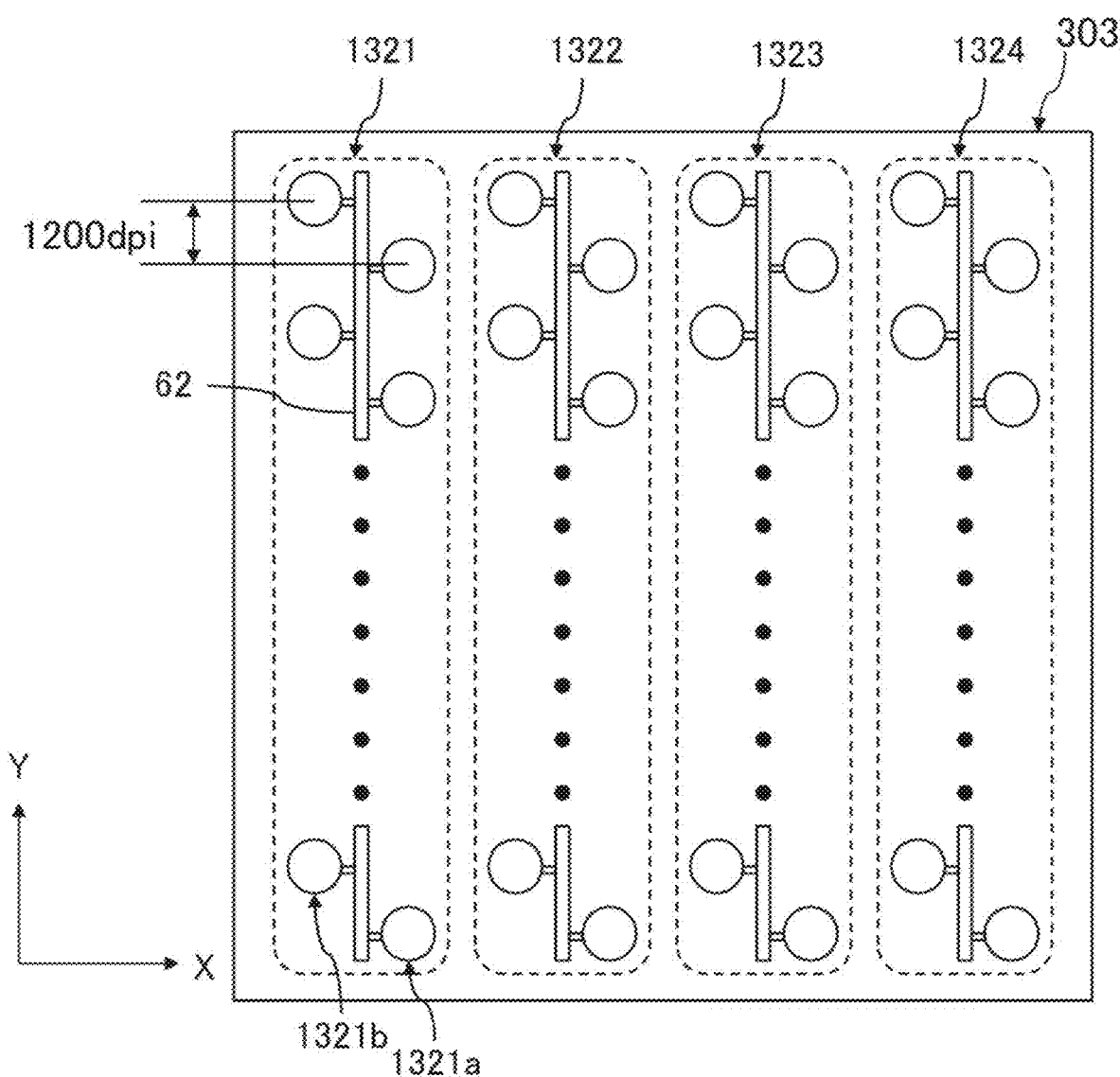
FIG. 13 is a schematic diagram in a case where the recording head is observed from the nozzle formation surface.

In a configuration in which a plurality of nozzle arrays is connected to the common liquid chamber, a similar issue may arise. The disclosure is also applicable to a recording head having a configuration in which a nozzle array including even-numbered nozzles and a nozzle array including odd-numbered nozzles are connected to the common liquid chamber, and are arranged while being shifted in the X direction, for example, as illustrated in FIG. 13. At this time, the simultaneous ejection of the ink presumably exerts influence on the ink ejection operations of the two nozzles adjacent using the common liquid chamber. For example, in a case where the ink is supplied from one common liquid chamber to two nozzle arrays included in a nozzle group 1321, ejection operation of a nozzle 1321a presumably exerts influence on ejection operation of a nozzle 1321b. In other words, in a case where the ink is supplied from the same common liquid chamber to the plurality of nozzle arrays, the simultaneous operation of the two nozzles adjacent in positions in the Y direction of the drawing (in drawing, nozzle 1321a and nozzle 1321b) is to be limited.

While a thermal recording head using an electrothermal conversion element as the recording element for ejecting the ink has been described in the above-described exemplary embodiments, the recording head may be a piezoelectric recording head that ejects the ink by applying a voltage to a piezoelectric element to change a volume.

In the above-described exemplary embodiments, a serial recording inkjet recording apparatus that records an image by scanning the recording head including the plurality of arranged nozzles in the direction intersecting the nozzle arrangement direction, has been described. The disclosure is applicable to a form in which an image is recorded by relative scanning of a recording medium and a recording head. For example, the disclosure may be applied to a full multi-inkjet recording apparatus in which the recording medium is conveyed in the direction intersecting the nozzle arrangement direction, and an image is recorded by using a line head that can record the image over the entire width of the recording medium by one time of scanning Even in the case of the full multi-inkjet recording apparatus, it is desirable that the above-described configuration be applied to a barcode in which bars extend in the nozzle arrangement direction.

While the width of each of the edge areas of the barcode is described as one pixel in the above-described exemplary embodiments, the number of pixels to be detected as an edge area may be two or more. In this case, it is desirable that the simultaneous ejection of the two adjacent nozzles be limited in a region in the nozzle arrangement direction with a width of one pixel. In other words, it is desirable that the difference between the ratios of the ink ejected from the two adjacent nozzles for the edge areas be greater than the difference between the ratios of the ink ejected from the two adjacent nozzles for the non-edge areas.

The disclosure can be realized by combining the configuration according to the first exemplary embodiment and the configuration according to the second exemplary embodiment.

According to the exemplary embodiments of the disclosure, it is possible to record a recorded article in which bars configuring a barcode each have a width intended by a user.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-108171, filed Jun. 29, 2021, which is hereby incorporated by reference herein in its entirety.

What is claimed is:

1. An inkjet recording apparatus, comprising:
a recording unit including a first nozzle array in which a plurality of nozzles is arranged in a first direction and a second nozzle array in which a plurality of nozzles is arranged in the first direction, where ink is supplied from a common liquid chamber to the first nozzle array and the second nozzle array, and the nozzles in the second array are arranged while being shifted from each of the nozzles in the first array in the first direction;
a scanning unit configured to perform relative scanning with a recording medium in a second direction intersecting the first direction; and
a control unit configured to acquire image data and configured to control ink ejection operation of the recording unit,
wherein in a case where ink droplets are ejected from the first nozzle array, part of energy related to the ink ejection operation of the recording unit propagates via the common liquid chambers and vibrates ink supplied to a nozzle adjacent to a nozzle that performs the ink ejection operation in the first direction among the nozzles in the second nozzle array,
wherein, in a predetermined one time of relative scanning, the control unit uses one of the first nozzle array and the second nozzle array, and does not use an other of the first nozzle array and the second nozzle array, for edge areas of a barcode including a plurality of bars in which a length in the first direction is longer than a length in the second direction and the edge areas of the barcode include a plurality of pixels in the second direction.

2. The inkjet recording apparatus according to claim 1, wherein, in the predetermined one time of relative scanning, the control unit uses the first nozzle array and the second nozzle array for non-edge areas of the barcode.

3. The inkjet recording apparatus according to claim 1, wherein one of the first nozzle array and the second nozzle array includes odd-numbered nozzles arranged in the first direction and the other includes even-numbered nozzles arranged in the first direction.

4. The inkjet recording apparatus according to claim 1, further comprising a detection unit configured to detect the edge areas from the image data.

5. The inkjet recording apparatus according to claim 4, wherein the detection unit detects, as the edge areas, only sides extending in the first direction, of the plurality of bars.

6. The inkjet recording apparatus according to claim 1, wherein the control unit completes recording for the edge areas by the predetermined one time of relative scanning.

7. The inkjet recording apparatus according to claim 1, wherein the control unit completes recording for the edge areas by a plurality of times of relative scanning including the predetermined one time of relative scanning.

8. The inkjet recording apparatus according to claim 7, wherein the control unit generates recording data corresponding to each of the plurality of times of relative scanning by dividing the image data by using pass masks corresponding to the plurality of times of relative scanning, and
wherein, for the edge areas, pass masks set so as to allow recording for a pixel corresponding to the first nozzle array and so as not to allow recording for a pixel corresponding to the second nozzle array are used.

9. The inkjet recording apparatus according to claim 1, wherein the first nozzle array and the second nozzle array are arranged while being shifted from each other in the second direction.

10. The inkjet recording apparatus according to claim 1, further comprising a carriage configured to move the recording unit in the second direction, relative to the recording medium.

11. An inkjet recording apparatus, comprising:
a recording unit including a first nozzle array in which a plurality of nozzles is arranged in a first direction and a second nozzle array in which a plurality of nozzles is arranged in the first direction, where ink is supplied from a common liquid chamber to the first nozzle array and the second nozzle array, and the nozzles in the second array are arranged while being shifted from each of the nozzles in the first array in the first direction;
a scanning unit configured to perform relative scanning with a recording medium in a second direction intersecting the first direction; and
a control unit configured to acquire image data and configured to control ejection operation of the ink from the recording unit,
wherein in a case where ink droplets are ejected from the first nozzle array, part of energy related to the ink ejection operation of the recording unit propagates via the common liquid chambers and vibrates ink supplied to a nozzle adjacent to a nozzle that performs the ink ejection operation in the first direction among the nozzles in the second nozzle array,
wherein, in a predetermined one time of relative scanning, the control unit performs control such that a difference between a ratio of the ink ejected from one of the first nozzle array and the second nozzle array and a ratio of the ink ejected from an other becomes a first value, for edge areas of a barcode including a plurality of bars in each of which a length in the first direction is longer than a length in the second direction and the edge areas of the barcode include a plurality of pixels in the second direction, and
wherein, in the predetermined one time of relative scanning, the control unit performs control such that the difference between the ratio of the ink ejected from the one of the first nozzle array and the second nozzle array and the ratio of the ink ejected from the other becomes a second value less than the first value, for non-edge areas of the barcode.

12. An inkjet recording method using a recording unit including a first nozzle array in which a plurality of nozzles is arranged in a first direction and a second nozzle array in which a plurality of nozzles is arranged in the first direction, where ink is supplied from a common liquid chamber to the first nozzle array and the second nozzle array, and the nozzle in the second array are arranged while being shifted from each of the nozzles in the first array in the first direction, and a scanning unit configured to perform relative scanning with a recording medium in a second direction intersecting the first direction, wherein in a case where ink droplets are ejected from the first nozzle array, part of energy related to the ink ejection operation of the recording unit propagates via the common liquid chamber and vibrates ink supplied to a nozzle adjacent to a nozzle that performs the ink ejection operation in the first direction among the nozzles in the second nozzle array, the inkjet recording method comprising:

acquiring image data and controlling ink ejection operation of the recording unit, wherein, in recording for edge areas of a barcode including a plurality of bars in which a length in the first direction is longer than a length in the second direction, in a predetermined one time of relative scanning, one of the first nozzle array and the second nozzle array is used, and an other of the first nozzle array and the second nozzle array is not used, and the edges areas of the barcode include a plurality of pixels in the second direction.

13. The inkjet recording method according to claim 12, wherein, in recording for non-edge areas of the barcode in the predetermined one time of relative scanning, the first nozzle and the second nozzle are used.

14. The inkjet recording method according to claim 12, wherein one of the first nozzle array and the second nozzle array includes odd-numbered nozzles arranged in the first direction and the other includes even-numbered nozzles arranged in the first direction.

15. The inkjet recording method according to claim 12, further comprising detecting the edge areas from the image data.

16. The inkjet recording method according to claim 15, wherein, in the detecting, the edge areas are detected only from sides extending in the first direction, of the plurality of bars.

17. The inkjet recording method according to claim 12, wherein the recording for the edge areas is completed by the predetermined one time of relative scanning.

18. The inkjet recording method according to claim 12, wherein the recording for the edge areas is completed by a plurality of times of relative scanning including the predetermined one time of relative scanning.

19. An inkjet recording method comprising:

acquiring image data and controlling ink ejection operation of a recording unit including a first nozzle array in which a plurality of nozzles is arranged in a first direction and a second nozzle array in which a plurality of nozzles is arranged in the first direction, where ink is supplied from a common liquid chamber to the first nozzle array and the second nozzle array, and the nozzle in the second array are arranged while being shifted from each of the nozzles in the first array in the first direction, and a scanning unit configured to perform relative scanning with a recording medium in a second direction intersecting the first direction, wherein in a case where ink droplets are ejected from the first nozzle array, part of energy related to the ink ejection operation of the recording unit propagates via the common liquid chamber and vibrates ink supplied to a nozzle adjacent to a nozzle that performs the ink ejection operation in the first direction among the nozzles in the second nozzle array, wherein, in recording for edge areas of a barcode including a plurality of bars in which a length in the first direction is longer than a length in the second direction, in a predetermined one time of relative scanning, a difference between a ratio of the ink ejected from one of the first nozzle array and the second nozzle array and a ratio of the ink ejected from an other of the first nozzle array and the second nozzle array is a first value, and wherein, in recording for non-edge areas of the barcode in the predetermined one time of relative scanning, the difference between the ratio of the ink ejected from the one of the first nozzle array and the second nozzle array and the ratio of the ink ejected from the other is a second value less than the first value and, wherein the edge areas of the barcode include a plurality of pixels in the second direction.

* * * * *